United States Patent
Tsuru

(10) Patent No.: US 7,036,893 B2
(45) Date of Patent: May 2, 2006

(54) RUBBER CRAWLER AND ITS MANUFACTURE METHOD

(75) Inventor: Eiji Tsuru, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 114 days.

(21) Appl. No.: 10/474,749

(22) PCT Filed: Apr. 9, 2002

(86) PCT No.: PCT/JP02/03542

§ 371 (c)(1),
(2), (4) Date: Oct. 10, 2003

(87) PCT Pub. No.: WO02/083484

PCT Pub. Date: Oct. 24, 2002

(65) Prior Publication Data

US 2004/0104621 A1    Jun. 3, 2004

(30) Foreign Application Priority Data

Apr. 10, 2001 (JP) .............................. 2001-110752

(51) Int. Cl.
*B62D 55/24* (2006.01)
*F16G 1/04* (2006.01)
(52) U.S. Cl. ...................... 305/170; 305/167
(58) Field of Classification Search .............. 305/165, 305/167–168, 170–173; 474/260–263
See application file for complete search history.

(56) References Cited

U.S. PATENT DOCUMENTS

| 1,612,024 A | * | 12/1926 | Jacobs | 474/262 |
| 3,582,154 A | * | 6/1971 | Russ | 305/166 |
| 3,941,005 A | * | 3/1976 | Gardiner et al. | 474/262 |
| 4,504,258 A | * | 3/1985 | Tanaka et al. | 474/263 |
| 6,523,915 B1 | * | 2/2003 | Matsuo | 305/167 |
| 6,843,539 B1 | * | 1/2005 | Tsuru | 305/170 |
| 2003/0107267 A1 | * | 6/2003 | Katoh et al. | 305/171 |

FOREIGN PATENT DOCUMENTS

| JP | 54-3737 | * | 1/1979 | 305/167 |
| JP | 56-167568 | * | 12/1981 | 305/167 |
| JP | 3-295776 | * | 12/1991 | 305/170 |
| JP | 4-283180 A | | 10/1992 | |

(Continued)

*Primary Examiner*—S. Joseph Morano
*Assistant Examiner*—Jason R. Bellinger
(74) *Attorney, Agent, or Firm*—Sughrue Mion, PLLC

(57) ABSTRACT

The object of the invention is to provide a rubber crawler which has an excellent driving performance without rubber breakage and a process for manufacturing the same. The object is attained by firstly obtaining a small bending rigidity of a joint part and eliminating disproportional arrangement of main cord embedded in the rubber crawler in a widthwise direction for obtaining durability, and uniform revolution.

In a rubber crawler 1 in the form of an endless belt having an inserting joint structure S wherein ends of a number of parallel reinforcing cords 3 as main cords embedded in the rubber crawler are inserted between each other, the number of reinforcing cords are divided in an even number (2 in the embodiments shown with figures) parts, the ends parts 3A1 to 3A6 and 3B1 to 3B6 extending in both directions are arranged axisymmetrically about the dividing line L. Accordingly, the inserting joint structure S is obtained as a prerequisite which is on a same plane when viewed from the side. Furthermore, it is possible to eliminate disproportional arrangement of the main cords to be embedded. As a result, driving performance is improved, and rubber breakage is prevented, whereby it is possible to further increase the durability.

13 Claims, 7 Drawing Sheets

FOREIGN PATENT DOCUMENTS

| | | |
|---|---|---|
| JP | 6-001271 A | 1/1994 |
| JP | 09249164 A | 9/1997 |
| JP | 11-301536 A | 11/1999 |
| JP | 2000344155 A | 12/2000 |

* cited by examiner

FIG. 3
(A)
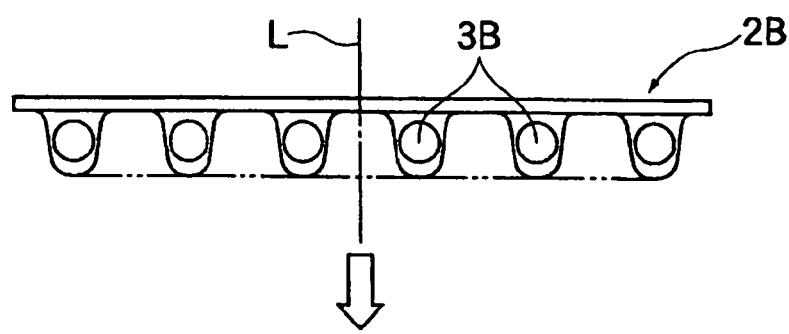
(B)
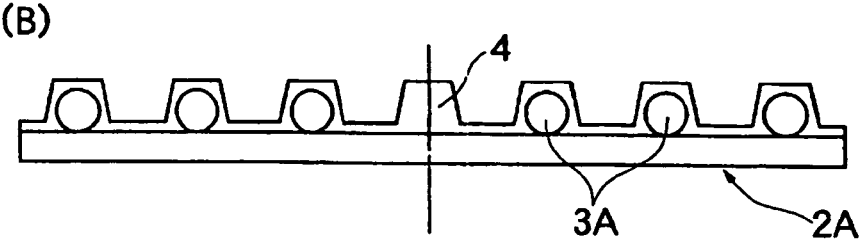
(C)
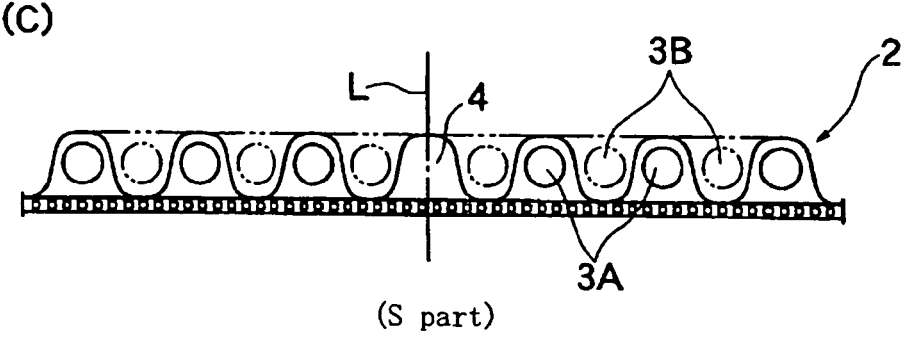
(S part)

(S part)

FIG. 6
(A) Main body part
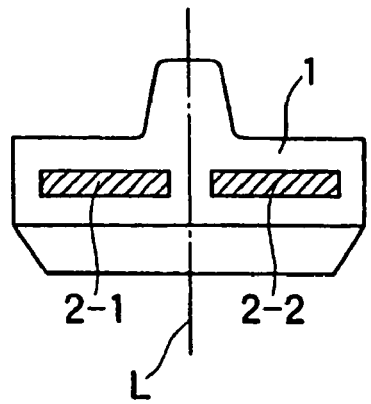
(B) Inserting part
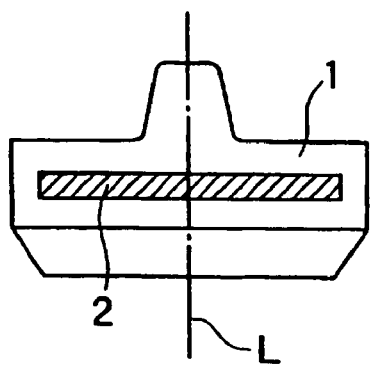
(C) Main body part
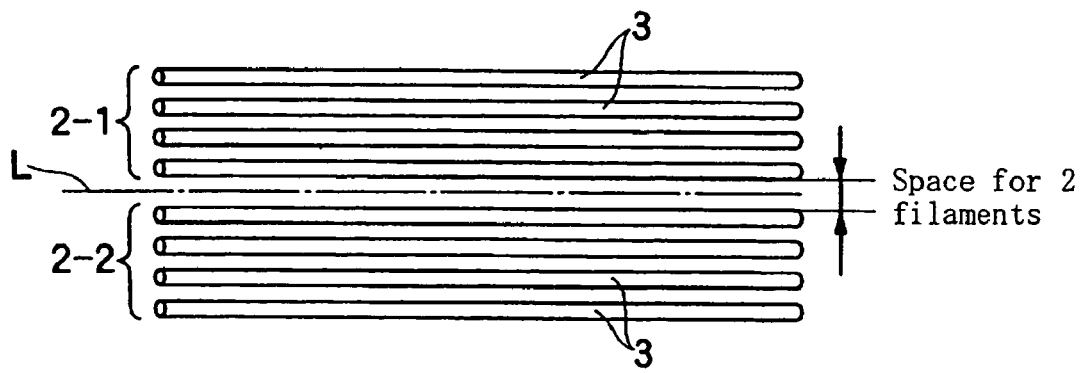
(D) Inserting part
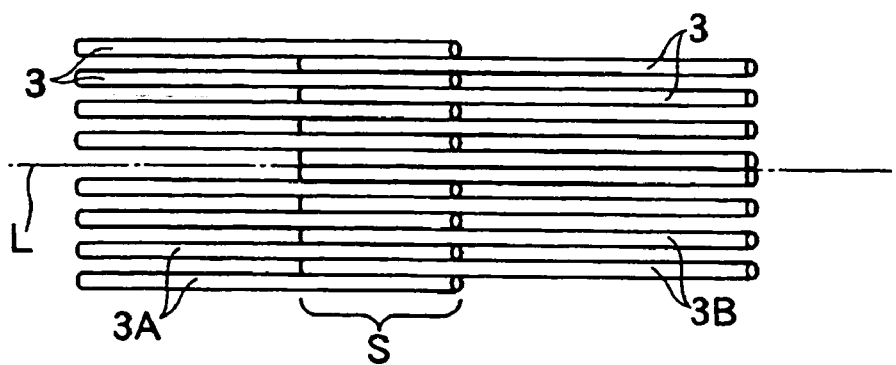

RUBBER CRAWLER AND ITS MANUFACTURE METHOD

BACKGROUND OF THE INVENTION

1. Technical Field

This invention relates to a rubber crawler in the form of an endless belt having an inserting joint structure wherein a number of parallel reinforcing cords as main cords having ends directing in both directions are embedded in a rubber crawler, the ends of the parallel reinforcing cords are connected by being inserted between each other, and a process for manufacturing the same.

2. Background Art

In general, a number of reinforcing cords as reinforcing cords (main cords), e.g., coated with a rubber are embedded in a rubber crawler at an approximately intermediate part with respect to the thickness thereof, for increasing the rigidity of the rubber crawler in the form of an endless belt and increasing the driving force. Such rubber crawler is manufactured by maintaining main cords between an unvulcanized outer peripheral rubber on an ground contacting side and an unvulcanized inner peripheral rubber on an inner peripheral side, and forming the rubber in this condition into a rubber crawler in the form of an endless belt by the vulcanization with heat applied thereto.

FIG. 7 shows an embodiment of such structure. As shown in the figure, main cords 33 are structured as a belt like material having a predetermined length, coated with a rubber. Both ends 33A and 33B are inserted between each other, whereby a superimposed connection S' is formed in an endless belt shape. Accordingly, an end of the superimposed connection S' of the main cords 33 at the ground-contacting outer periphery shows a certain behavior, that is, the end tends to spring up to an outer peripheral side because tension is applied to the rubber crawler main body 31 and bending causes by winding on a driving sprocket. As a result, it is possible that a locational stress is generated, and that cracks generate and rapidly grow.

Various technologies are proposed, for preventing the generation of such locational stress at the superimposed connection S' of the main cords 33. For instance, Japanese Kokai Publication 9 (1997)-249164 discloses that an end part of a steel cord connected by superimposing is formed to have a flat shape by untwisting the end part for a predetermined length, and that the thus treated end part is incorporated in the crawler main body made of a rubber material by embedding the end part therein. By this structure, the bending rigidity at the end part of the steel cord is decreased, the locational stress at a non-adhered part thereof is dispersed, and the spring up behavior is decreased. Thus, the end part of the steel cord has an improved durability.

In such conventional structure of the superimposing connection of the main cord, however, it is necessary to form the end part of the main cords such as steels cord to have a flat shape by untwisting the end part over a predetermined length. The process for this operation requires labor and time. Furthermore, it tends to cause ununiformity among constituent cords. Moreover, it is possible that the end part of the main cords get untied by a rubber flow during vulcanization of an unvulcanized rubber by application of heat, even if the thus specially configured end part of the main cords are put in a proper order and placed in an unvulcanized rubber. As a result, each constituent cord in the rubber crawler after vulcanization and forming receives uneven (non-uniform) tension. Therefore, it is possible that some cords are broken.

Under considering such situation, the applicant of the present invention proposed a rubber crawler as shown in FIG. 8 (Japanese Patent Application 11-160356) in order to maintain the uniform revolution of the rubber crawler and to improve the durability thereof. For this purpose, the bending rigidity of a superimposed connection in the rubber crawler is lowered, which is in the form of an endless belt where main cords having the superimposed connection are embedded. A brief explanation will be made about the above-mentioned technology. A number of reinforcing cords 12 as main cords are wound in a predetermined winding direction, and superimposed connections 12-1 and 12-2 are formed when viewed from a lateral side (in the direction of an arrow). Namely, the closest first cord is provided in a wound condition for one round from a beginning end 12-1 to a terminal end 12-2, thereby forming a superimposed connection where both ends are superimposed to one another when viewed from a lateral side.

In other words, the beginning end 12-1 and the terminal end 12-2 are provided on the same plane. All of the reinforcing cords are arranged in the same way. Accordingly, a rubber crawler in the form of an endless belt is structured by an inserting joint structure where a number of main cords are inserted and connected between each other.

By the proposal of the rubber crawler having the inserting joint structure which is formed in such condition where the number of main cords are inserted between each other in an identical plane, the bending rigidity of the connection part of the main cords is decreased, the revolution state is uniformly maintained, and hence the durability is increased.

However, a number of cords 12 as main cords are embedded in a rubber crawler has an inserting joint structure which by winding the cords in a predetermined winding direction, and inserting the cords between each other so as to locate both ends approximately on a same plane when view from a lateral side. In this case, it is inevitable that a widthwise shift generates between lateral ends 12A on one side and lateral ends 12B on the other side.

For clarification, the above configuration will be explained by referring to three reinforcing cords 12. Lateral ends 12A3, 12A2 and 12A1 on one side are successively inserted between lateral ends 12B3, 12B2 and 12B1 on the other side so as to arrange the one side ends on the other side ends. Accordingly, the outermost reinforcing cords 12A1 and 12B3 on both sides of the inserting joint are positioned with a shift by 1 pitch as a cord placing pitch. As a result, the spaces on both sides of the rubber crawler 11 are differently produced (b1>b2 in the figure). In this case, it is possible that the rubber crawler has a problem as to driving performance at a high speed. There is also such a risk that the narrower end of the rubber crawler is subjected to edge breakage by the use for a long period of time.

SUMMARY OF THE INVENTION

It is an aspect of the present invention to provide a rubber crawler and a process for manufacturing the same by further developing the above-mentioned rubber crawler proposed by the applicant of the present invention with effectively using the specific character of the rubber crawler having an inserting joint structure prepared on an identical surface when viewed from a lateral side, which has a low bending rigidity of the joint part and maintains an uniform revolution, and hence guaranteed durability, with improved driving performance and no risk of rubber breakage.

In order to achieve the above aspect, a rubber crawler according to an exemplary embodiment of the invention is in the form of an endless belt having an inserting joint structure wherein a number of parallel reinforcing cords as main cords having ends extending in both directions are embedded in the rubber crawler, the ends connected by being inserting between each other, characterized in that the number of reinforcing cords are divided into even number parts in a widthwise direction based on a dividing line as a centerline, and the ends, which are extending in both directions and inserted between each other, are arranged to be axisymmetrical about the dividing line.

Accordingly, the joint part has a low bending rigidity, and the uniform revolution is maintained. Furthermore, the ununiformity of arrangement in a widthwise direction of the embedded main cords is eliminated, the driving performance is improved, and the problem of edge breakage on the lateral end by the use for a long period of time is solved.

The rubber crawler according to another exemplary aspect of the invention has the inserting joint structures formed at a plurality of divided locations in a circumferential direction (rubber crawler extending direction). Based on the structure, the bending rigidity of the connection is still lowered, the strength is improved, and the uniform revolution is further increased. Moreover, the design freedom of the joint structure is increased.

The rubber crawler according to a further aspect of the invention is characterized in that a number of parallel reinforcing cords having ends extending in both directions forms the joint structure which are arranged so as to be brought into approximately close contact with each other under the condition of being inserted between each other.

Accordingly, it is possible to control the maldistribution of the reinforcing cords toward a centerline in the inserting joint structure when traction force in a longitudinal direction of the rubber crawler is applied thereto.

A process for manufacturing a rubber crawler is also provided, such that the ends of the cords are axisymmetrically arranged on both sides of a dividing line with firstly dividing the cords in even number parts in a widthwise direction, the ends are inserted between each other, and then vulcanization and forming the rubber crawler are carried out. According to this process, it is made possible to provide a connection in the reinforcing cords in a proper position in an unvulcanized state. Thus, the production is accelerate.

In the process for manufacturing the rubber crawler according to an exemplary embodiment, the inserting joint structures formed at a plurality of divided parts in a circumferential direction are successively or simultaneously formed. Accordingly, it is possible to rapidly and precisely produce the joint structure of a rubber crawler with decreasing the bending rigidity of the above-mentioned connection, increasing the strength, and further increasing the uniform revolution and the durability.

BRIEF DESCRIPTION OF THE DRAWINGS

FIG. 3 is a schematic diagram for explaining a process for manufacturing an inserting joint part.

FIG. 6 contains a cross section and plane view of a part of a main body part and an inserting joint part as a fourth embodiment of a rubber crawler and a manufacturing method thereof according to the present invention.

Figure 1:
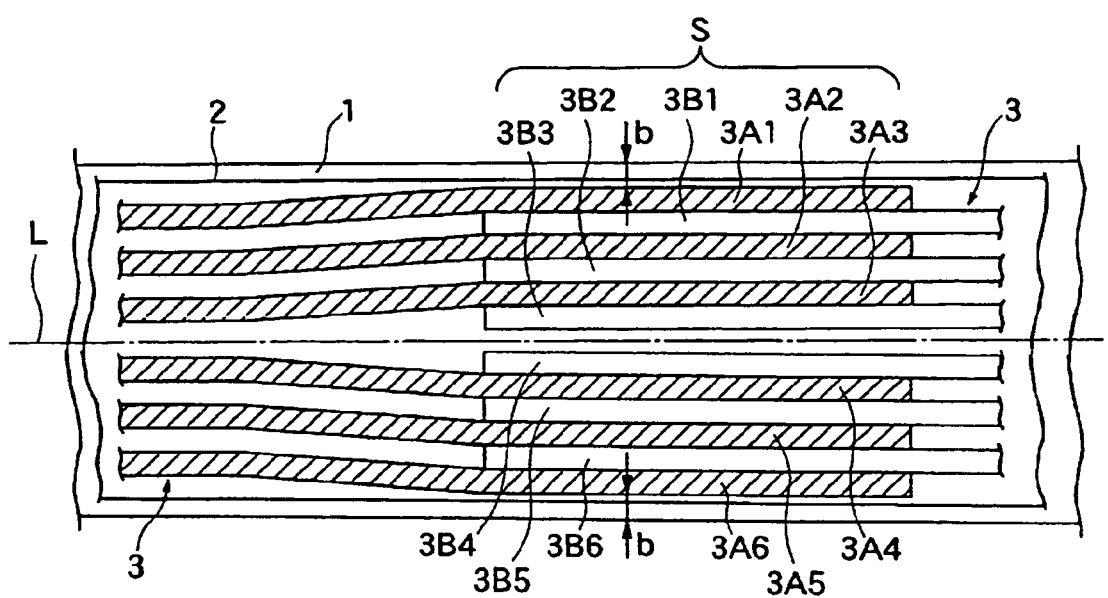
FIG. 1 is a plane view for explaining a part of an inserting joint of a rubber crawler as a first exemplary embodiment of a rubber crawler and a manufacturing apparatus therefor.

The following is an exemplary explanation of reference numerals.

1 Rubber crawler
2 Cord covered with rubber
2A Cord covered with rubber on one side
2B Cord covered with rubber on the other side
3 Main cords (Reinforcing cords)
3A Reinforcing cords on one side
3B Reinforcing cords on the other side
4 Dummy rib
5 Breaker
S Inserting joint part
S1 First inserting joint part
S2 Second inserting joint part
L Dividing line
L1 First divining line
L2 Second dividing line

DETAILED DESCRIPTION OF EXEMPLARY EMBODIMENTS OF THE INVENTION

Figure 2:
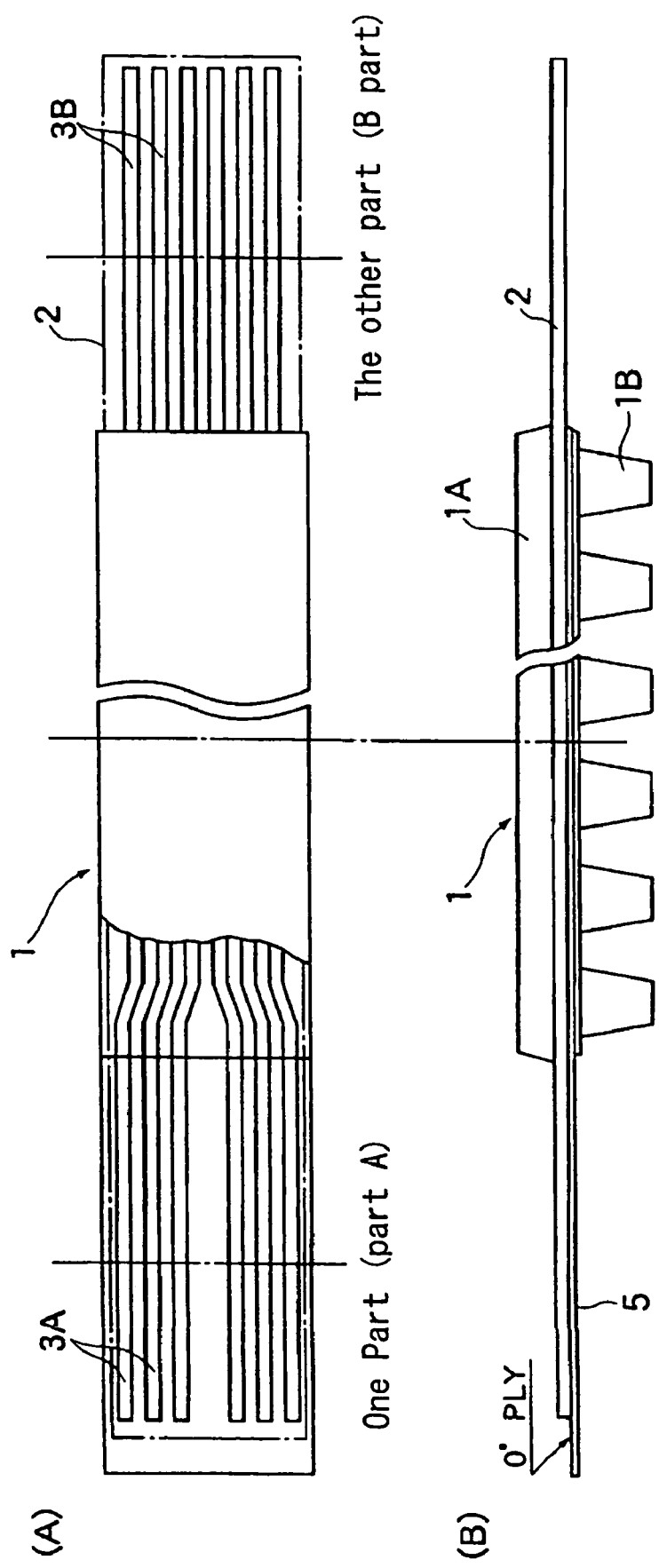
FIG. 2 contains a plane view and a side view of an entire part of a rubber crawler with reinforcing cords on both ends exposed.

Embodiments of the present invention will now be explained in detail based on figures. FIGS. 1 to 3 show a first embodiment of a rubber crawler according to the present invention and a manufacturing apparatus therefor. FIG. 1 is a plane view of an essential part of an inserting joint part of the rubber crawler wherein the arrangement of reinforcing cords is described. FIG. 2 is a plane view for showing the entire part of the rubber crawler with both sides of the reinforcing cords being exposed, and a side view thereof. FIG. 3 is a schematic view for explaining a process for manufacturing the inserting joint part.

As shown in FIG. 1, a rubber crawler 1 contains a number of reinforcing cords 3 as main cords embedded in the rubber crawler 1. The ends of the plurality of parallel reinforcing cords 3 directing in both directions are inserted between each other and connected to form an inserting joint structure S in the form of an endless belt. It is characteristic that a number of reinforcing cords 3 are divided into even number parts in a widthwise direction, each containing a predetermined number of the cords.

In the embodiment of the present invention, six reinforcing cords 3 constituting a cord 2 covered with a rubber are divided into two (even number) parts in a widthwise direction, each containing 3 cords.

Then, end parts 3A1 to 3A6 on one side and end parts 3B1 to 3B6 on the other side of the reinforcing cords constituting the inserting joint structure S are arranged as follows. First, the ends 3B1 to 3B6 on one side of the reinforcing cords are arranged based on a predetermined placing pitch. Namely, the reinforcing cords are arranged so as to have intervals between each other and the ends 3B1 and 3B6 are placed to make the distances from themselves to the lateral ends of the rubber crawler equal to each other. Subsequently, the ends 3A1 to 3A6 on the other side of the reinforcing cords are respectively provided on outer sides of the ends 3B1 to 3B6 of the reinforcing cords axisymmetrically about a dividing line L as a centerline.

Namely, a pair of innermost ends 3A3 and 3A4 on one side of the reinforcing cords is provided on outsides, with respect to the width, of a pair of outermost ends 3B3 and 3B4, which are closest to the dividing line L among the ends 3B, on the other side of the reinforcing cords. The other ends on one side are successively inserted between the ends on the other side so as to be placed on the ends on the other side. In this way, an inserting joint structure S is formed.

Initially, it is possible that the reinforcing cords in the main body other than the joint part are axisymmetrically positioned about the dividing line L as the centerline. It is also possible to axisymmetrically arrange the ends 3B on the other side and ends A on one side in the inserting joint structure S. The distances from 3A1 and 3A6, the outermost reinforcing cords, to both ends of the rubber crawler 1 are equal to each other. Therefore, the ununiformity of the embedded main cords in a widthwise direction is eliminated.

FIG. 2 contains a plane view of an entire rubber crawler with the reinforcing cords on both ends being exposed, and a side view. FIG. 2(A) clearly describes that the ends 3A of the reinforcing cords on one side constituting the inserting joint structure S are arranged to spread to outer sides in a widthwise direction, and that the ends 3B of the cords on the other side is arranged to have a predetermined placing pitch therebetween. Namely, the intervals between the outermost reinforcing cords and the lateral ends of the rubber crawler are equal, and the cords are arranged with maintaining an equal distance each other.

From FIG. 2(B) as a side view, it is understood that the rubber crawler 1 is structured by the main cords 2 wherein the reinforcing cords 3 is embedded, a breaker 5 overlaid thereon, and a rubber layer 1A on an inner peripheral side and a ground-contacting lag 1B provided on both sides of the main cord.

FIG. 3 is a schematic diagram for explaining a process for manufacturing the inserting joint part. FIG. 3(A) is a cross-section of the ends 3B on the other side, and FIG. 3(B) is a cross section of the ends 3A on one side. The figures depict the state where the cords are axisymmetrically divided on both sides of the dividing line L into even number (2) parts in a widthwise direction.

The ends 3A and 3B extending in both directions are treated on a plate shaped members made of an unvulcanized rubber as follows. First, the ends 3B on the other side are covered with an unvulcanized rubber and positioned to give a predetermined placing pitch. Hence, the ends 3B are prepared as a cord 2B on the other side which is covered with a rubber. The ends 3A on one side are arranged to spread based on the center toward outer sides with respect to a widthwise direction. The ends 3A are covered with an unvulcanized rubber and positioned. Hence, the ends 3A are prepared as a cord 2A on one side which is covered with a rubber.

Then, the cords are inserted between each other as shown in FIG. 3(C). Thereafter, pressure and heat are applied to the cords, whereby the rubber crawler is vulcanized and formed. Here, in the embodiment of the invention, a space is formed between the innermost reinforcing cords 3A3 and 3A4 by the arrangement of the cords directing outside with respect to the width (refer to FIG. 1). It is preferable to form a dummy rib 4 in the space, as shown in FIGS. 3(B) and 3(C).

Figure 4:
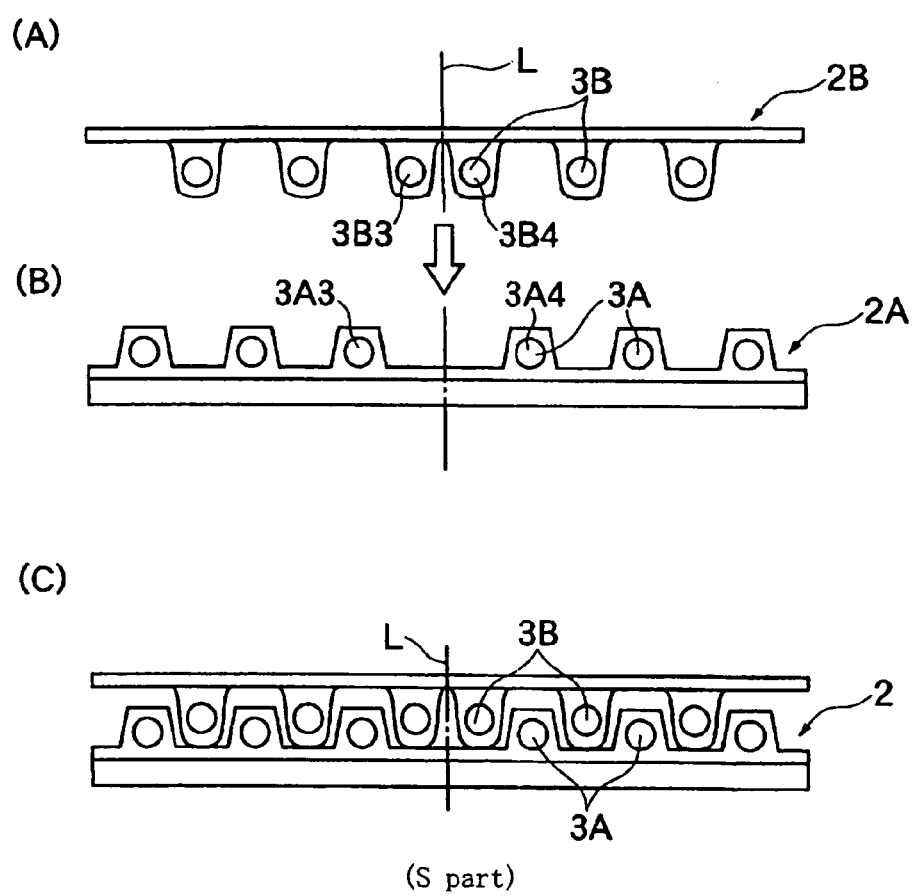
FIG. 4 is a schematic diagram of a rubber crawler and a manufacturing method thereof as a second exemplary embodiment which explains a manufacturing method of the inserting joint part.

FIG. 4 shows a second embodiment of the rubber crawler and the manufacturing method thereof. According to the embodiment of the invention, one configuration is possible wherein the reinforcing cords are axisymmetrically placed about the divining line L as a centerline in the inserting joint structure S part. Namely, the ends 3B on the other side contain a pair of the innermost ends 3B3 and 3B4 on the other side having a smaller pitch than the placing pitch for the other cords. Then the ends 3B are covered with an unvulcanized rubber and positioned. Thus, the cord 2B on the other side covered with a rubber is firstly prepared.

As shown in FIG. 4(B), the ends 3A on one side contain a pair of innermost ends 3A3 and 3A4 on one side having a space therebetween. The space has a proper size for containing therein the above-mentioned pair of the innermost ends 3B3 and 3B4 on the other side. The ends 3B are covered with an unvulcanized rubber and positioned. Thus, the cord 2A on the other side covered with a rubber is firstly prepared.

Figure 5:
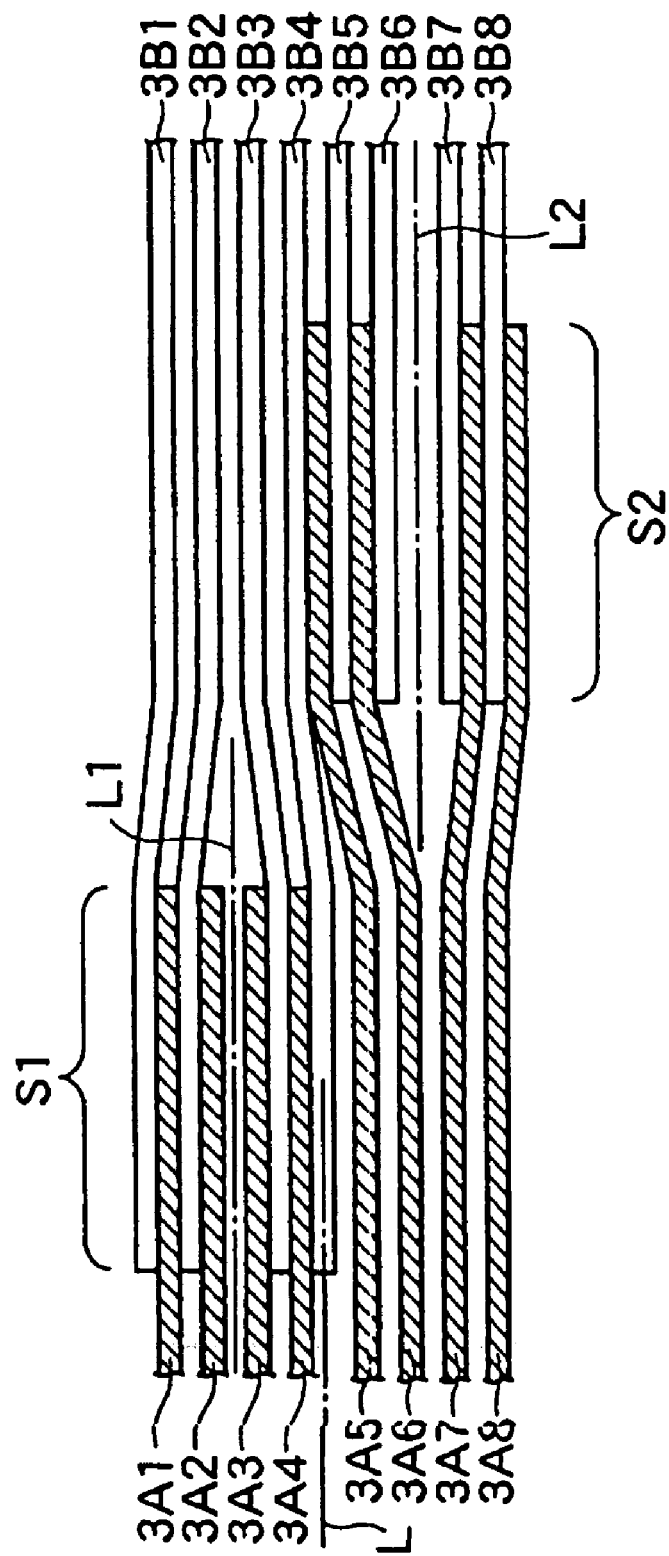
FIG. 5 is a plane view showing reinforcing cords of an inserting joint part of a third exemplary embodiment of a rubber crawler and a process for manufacturing the same.
Figure 7:
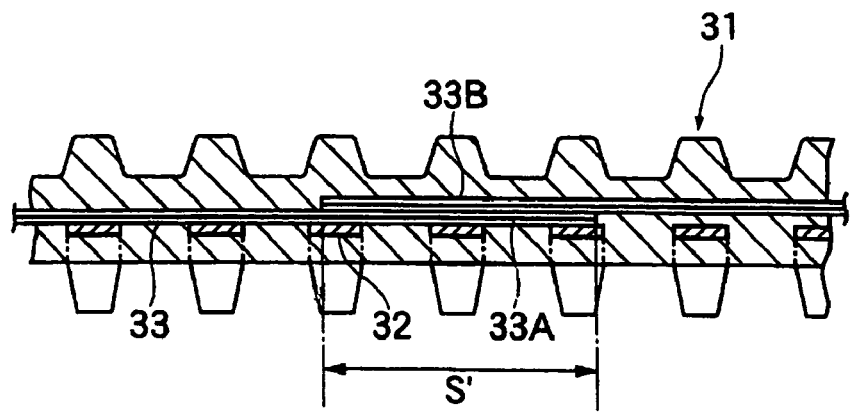
FIG. 7 is a cross section of a connection of a conventional rubber crawler.
Figure 8:
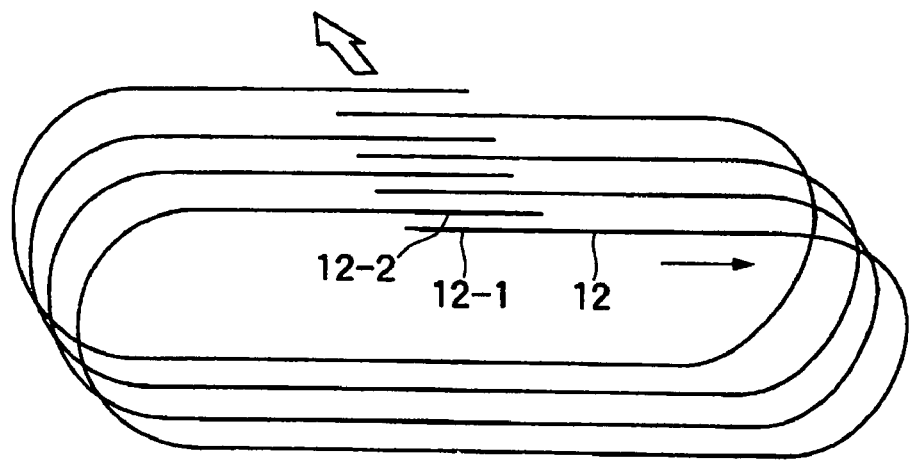
FIG. 8 is a diagram for explaining a technology as a premise of a rubber crawler and a process for manufacturing the same according to the present invention.
Figure 9:
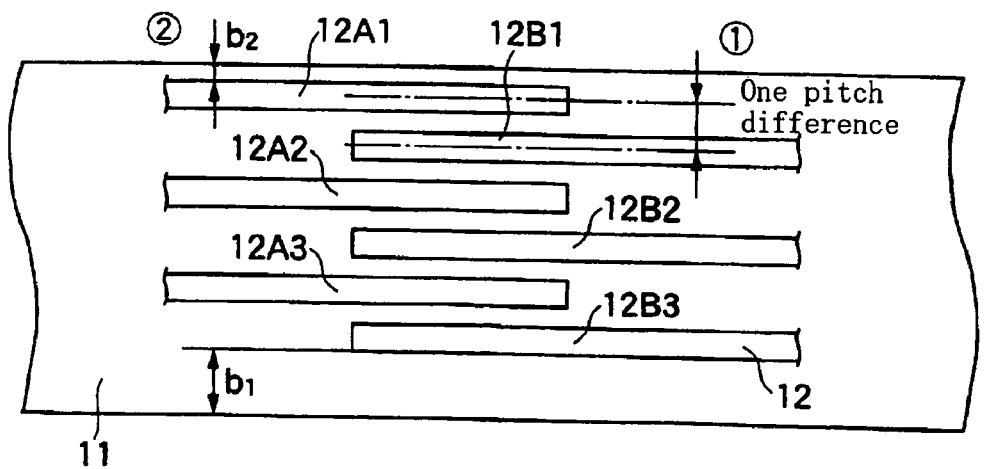
FIG. 9 is a plane view for showing an essential part of a conventional rubber crawler.

FIG. 5 shows a third embodiment of a rubber crawler and a process for manufacturing the same according to the present invention. The rubber crawler of this embodiment is characterized in that the inserting joint structures S (S1 and S2) are formed in a circumferential direction (longitudinal direction of the rubber crawler) at a plurality of parts (2 parts, S1 and S2). In the embodiment, a number of reinforcing cords are divided into for parts in a widthwise direction and inserted between each other in the inserting joint structure.

The ends of the cords to be inserted between each other are divided based on dividing lines L1 and L2, in addition to the division based on the dividing line L as a centerline with the placing pitch of the reinforcing cords. Namely, a group including the ends 3A1 to 3A4 on one side and the ends 3B1 to 3B4 on the other side and a group including the ends 3A5 to 3A8 on one side and ends 3B5 to 3B8 on the other side are further divided axisymmetrically into two parts based on the dividing lines L1 and L2 as centerlines (an inserting joint structure S1 composed of 3A1 to 3A4 and 2B1 to 3B4, and an inserting joint structure S2 composed of 3A5 to 3A8 and 4B5 and 3B8).

The first inserting joint structure S1 divided based on the dividing line L1, and the second inserting joint structure S2 divided based on the dividing line L2 are arranged to be spaced apart from each other in a circumferential direction. By this structure, the joint parts are distributed in a circumferential direction. Therefore, the bending rigidity of the joint part is lowered, and the uniform revolution is maintained. Thus, the durability can be obtained.

In the embodiment of the present invention, the first inserting joint structure S1 and the second inserting joint structure S2 have different arrangements as to the relationship between the ends 3A on one side and the ends 3B on the other side. Namely, the joint structure S1 has an arrangement where the ends 3A on one side are inserted between the ends 3B on the other side so as to place the ends 3A on one side placed on inner sides of the ends 3B with respect to a widthwise direction of the rubber crawler. On the other hand, the joint structure S2 has such an arrangement that the ends 3A on one side are inserted between the ends 3B on the other side so as to place the ends 3A on outer sides of the ends 3B with respect to a widthwise direction of the rubber crawler. The entire arrangement is well balanced.

FIG. 6 is a diagram for showing a forth embodiment of a rubber crawler and a process for manufacturing the same according to the present invention. In this embodiment, cords 2-1 and 2-2 covered with a rubber containing the number of reinforcing cords 3 embedded therein are divided based on a dividing centerline L, and the dividing interval is formed as a space approximately for two reinforcing cords 3.

FIGS. 6(B) and 6(D) are diagrams for showing inserting joint parts where the ends of the reinforcing cords 3 extending in both directions are inserted between each other. The ends to be inserted between each other are axisymmetrically arranged based on the above-mentioned dividing line L. The characteristic point in this arrangement is that two ends 3B on the other side which are closest to the centerline L are inserted between the two ends 4A on one side which are closest to the centerline L.

Accordingly, the reinforcing cords 3 are closely placed to each other in the inserting joint part S by maintaining the structure as cords covered with a rubber. Even when a traction force is the rubber crawler in a lengthwise direction thereof, the arrangement prevents the cords 3 from maldistribution, namely from gathering around the centerline L. Moreover, it is preferable to place the reinforcing cords 3 which inclines from the main body part to the inserting joint part S with the application of gentle inclination angle (inclination is applied over a sufficient distance). In this case, it is possible to prevent the reinforcing cords from locally shifting toward the centerline L even if a traction force in a lengthwise direction is applied.

Although the detailed explanation was made on the embodiments of the present invention, it is possible to apply various modification within the scope of the present invention. For instance, it is possible to appropriately select the shape of the rubber crawler and the material therefor, the kinds of the main cords and of the reinforcing cord as a breaker cord, material thereof and style for covering these with a rubber, the number of cords, and the structural relationship between a core and the cords when the rubber crawler contains the core, and a driving form of the rubber crawler by use of a sprocket or the like.

Moreover, the configuration or method for arranging or providing the cords in the inserting joint part is not limited to the above-mentioned embodiment where the positioning is made by covering the cords with a rubber in the form of a rubber plate. It is possible that the plate shaped rubber members contain the cords by the provision of channels therein. Moreover, it is possible to appropriately select the vulcanization form of the inserting joint part, the number of the reinforcing cords and the dividing number thereof.

As described in detail, the inserting joint structure of the present invention has the ends of a number of parallel cords as main cords extending in both directions are inserted between each other to form the main cords in the form of an endless belt, the number of reinforcing cords are divided into even number parts in a widthwise direction, and the ends extending in both directions to be inserted between each other are axisymmetrically arranged based on the dividing line. It is possible to decrease the bending rigidity of the joint parts in the inserting joint structure, the joint parts being provided in the same plane when viewed from the lateral side. Moreover, ununiformity in a widthwise direction of the main cords embedded in the crawler is eliminated, and an improved driving performance is obtained. Thus, it is possible to further increase the durability without the risk of edge breakage.

Moreover, it is possible to lower the bending rigidity of the connection part and increase the strength, when the above-mentioned inserting joint structures are dispersedly formed at a plurality of parts in a circumferential direction (longitudinal direction of the rubber crawler). In addition to the above, the uniform revolution is further increased and the durability is maintained. Furthermore, the design freedom of the joint structure is increased.

Moreover, the ends of a number of parallel reinforcing cords extending in both directions (approximately) closely contact to each other under the condition where the ends are inserted between each other. By this configuration, it is possible to prevent the reinforcing cords from local shifts toward the centerline when a traction force is applied in a lengthwise direction.

Furthermore, in the process for manufacturing the rubber crawler in the form of an endless belt having the inserting joint structure wherein the ends of a number of parallel reinforcing cords extending in both directions are inserted between each other, the cords as the main cords to be embedded in a rubber crawler, the ends, which are firstly symmetrically arranged on both sides of the dividing line with being divided into even number parts in a widthwise direction, are connected by being inserted between each other, and then the rubber crawler is subjected to vulcanization and forming. Accordingly, it becomes possible to provide the connecting ends in the reinforcing cords in an unvulcanized state to a proper location by a manufacturing apparatus. Therefore, the manufacture is accelerated and the quality is stabilized.

Still further, the above-mentioned inserting joint structures dispersedly formed in a plurality of parts in a circumferential direction are successively or simultaneously formed. In this case, the inserting joint structure has a small bending rigidity of the connection part and an improved strength thereof. The joint structure with an improved reliability can be speedily manufactured.

Because the specific character of the rubber crawler having an inserting joint structure made on an identical plane when viewed from the side effectively used according to the present invention, the bending rigidity of the joint structure is low, uniform revolution and improved durability are obtained as prerequisites. In addition to the above, the disproportional arrangement of the main cords to be embedded is eliminated. As a result, it is possible to provide a rubber crawler having an excellent driving performance without rubber breakage or the like, and a manufacturing process therefor.

What is claimed is:

1. A rubber crawler in the form of an endless belt, said rubber crawler comprising:
    a joint structure including a plurality of parallel reinforcing cords having ends that are disposed to alternately extend in opposing longitudinal directions of the belt and are embedded in the rubber crawler, such that said ends are connected to contact each other by being inserted between each other,
    wherein said plurality of reinforcing cords are divided into an even number of parts in a widthwise direction based on a centerline of the belt that divides said reinforcing cords, and
    said ends are arranged to be axisymmetrical about said dividing line.

2. The rubber crawler as claimed in claim 1, wherein said joint structure is formed at a plurality of spaced locations in a circumferential direction of said endless belt.

3. The rubber crawler as claimed in claim 1, wherein said ends of said reinforcing cords are arranged to be in approximately close contact with each other when being inserted between each other.

4. A process for manufacturing a rubber crawler in the form of an endless belt, the method comprising:

forming a joint structure by placing a number of reinforcing cords, in said rubber crawler, having ends disposed to alternately extend in opposing longitudinal directions of the belt and are embedded in the rubber crawler, connecting said ends to contact each other by inserting said ends between each other, wherein said ends are divided into an even number parts in a widthwise direction based on a centerline of the belt that divides said reinforcing cords, and are arranged axisymmetrically on both sides of said centerline, and applying heat to said rubber crawler.

5. The process for manufacturing a rubber crawler as claimed in claim 4, wherein said joint structure is formed at a plurality of spaced locations in a circumferential direction of the belt, which are successively or simultaneously manufactured.

6. The rubber crawler as claimed in claim 1, wherein said plurality of reinforcing cords are divided into a first group on one side of the center line and a second group on the other side of the center line, such that the end of an innermost cord in each group extends in the same direction.

7. The rubber crawler as claimed in claim 1, wherein a plurality of said reinforcing cords are positioned to be parallel to the belt upon entering the joint structure and the remainder of the reinforcing cords are positioned to be angled upon entering the joint structure.

8. The rubber crawler as claimed in claim 1, wherein said ends contact each other only in an area of said joint structure.

9. The rubber crawler as claimed in claim 1, wherein said ends are disposed to alternately extend in the longitudinal directions, such that the cords have portions facing in the longitudinal directions that do not oppose each other.

10. The process for manufacturing a rubber crawler as claimed in claim 4, further comprising dividing said plurality of reinforcing cords into a first group on one side of the center line and a second group on the other side of the center line, such that the end of an innermost cord of each group extends in the same direction.

11. The process for manufacturing a rubber crawler as claimed in claim 4, further comprising positioning a plurality of said reinforcing cords to be parallel to the belt upon entering the joint structure and the remainder of the reinforcing cords to be angled upon entering the joint structure.

12. The process for manufacturing a rubber crawler as claimed in claim 4, further comprising positioning said ends to contact each other only in an area of said joint structure.

13. The process for manufacturing a rubber crawler as claimed in claim 4, further comprising positioning said ends to alternatively extend in the longitudinal directions, such that the cords have portions facing in the longitudinal directions that do not oppose each other.

* * * * *